No. 607,201. Patented July 12, 1898.
A. B. WAGGONER.
SPRING WHEEL FOR VEHICLES.
(Application filed July 13, 1897.)
(No Model.)
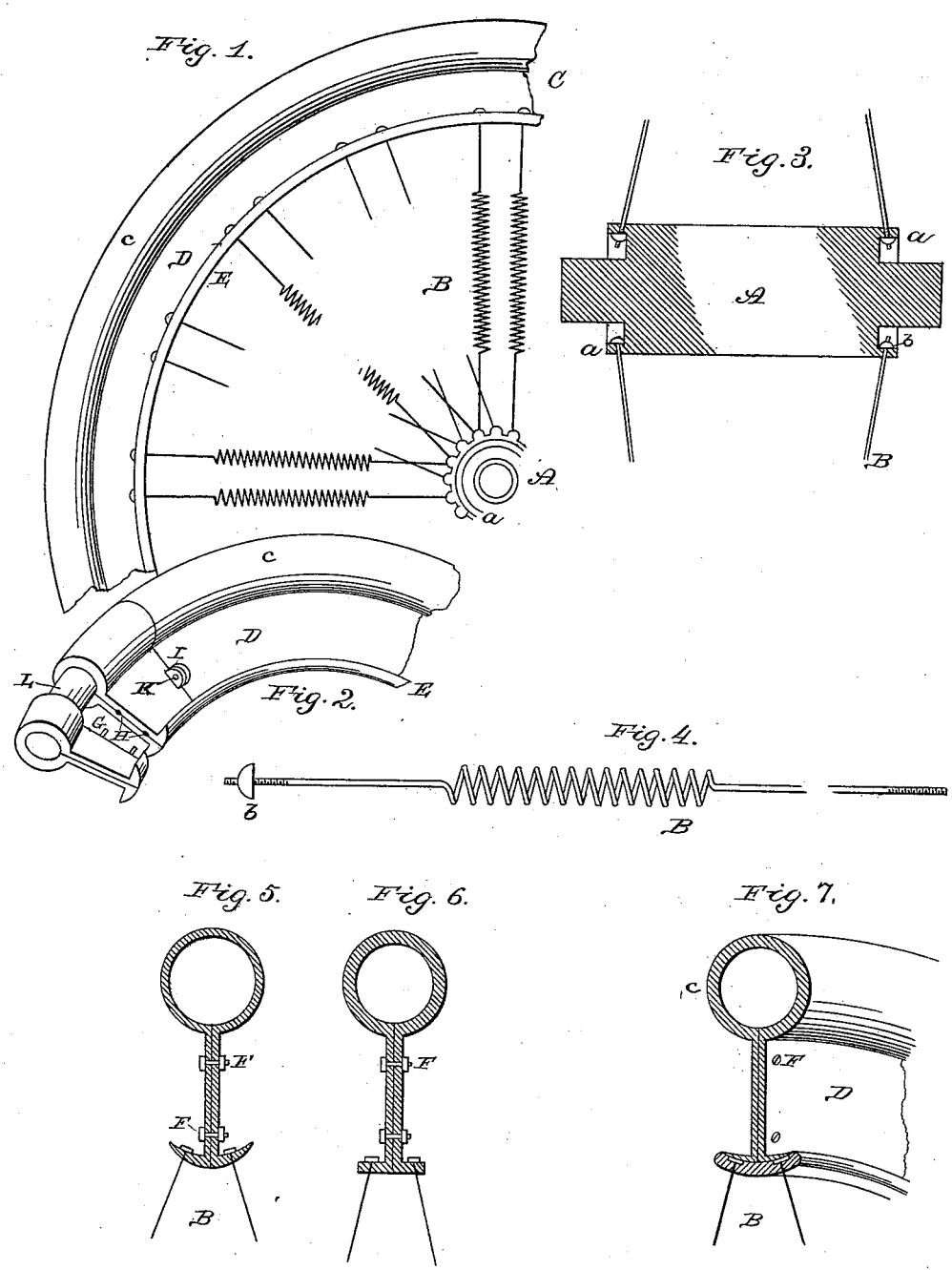
Witnesses
Vena A. Wells
Joe Beall
Inventor
Albert B. Waggoner,
by Fred Beall and
J. W. Garner
Attorneys.

UNITED STATES PATENT OFFICE.

ALBERT B. WAGGONER, OF ARKANSAS CITY, KANSAS, ASSIGNOR OF ONE-HALF TO WILLIAM WAGGONER, OF SAME PLACE.

SPRING-WHEEL FOR VEHICLES.

SPECIFICATION forming part of Letters Patent No. 607,201, dated July 12, 1898.

Application filed July 13, 1897. Serial No. 644,434. (No model.)

*To all whom it may concern:*

Be it known that I, ALBERT B. WAGGONER, a citizen of the United States, residing at Arkansas City, in the county of Cowley, State of Kansas, have invented a new and useful Improvement in Spring-Wheels for Vehicles, of which the following is a specification.

My invention relates to improvements in spring-wheels for vehicles; and it consists in the peculiar construction and combination of devices that will be more fully set forth hereinafter and particularly pointed out in the claims.

The object of my invention is to provide a wheel adapted to be used especially for vehicles engaged in transporting dynamite and other explosives, which, while being very strong and durable, shall be also springy and resilient, to the end that the vehicle shall ride easily and prevent the dynamite or other explosive from being subjected to dangerous jars or concussions.

In the accompanying drawings, Figure 1 is a partial side elevation of a spring-wheel embodying my improvements. Fig. 2 is a detailed view of the same, showing the construction of the felly or rim. Fig. 3 is a detail view of the hub. Fig. 4 is a similar view of one of the spring-spokes. Figs. 5, 6, and 7 are detail sectional views of the felly or rim.

The hub A of my improved wheel is provided at each end with an annular flange $a$, having openings through which are inserted the inner ends of the spring-spokes B, having taps $b$ screwed on their inner ends to secure them to the flanges of the hub, as shown.

The rim C of my improved wheel is made of metal rolled in the form shown and bent to form the outer annular hollow rim $c$, which constitutes also the tire, the intermediate web D, and the flanges E at the inner side of the web, which flanges are bent or rolled outward, have openings to receive the outer ends of the spring-spokes, as shown, and may be either straight, concave, or convex, as shown in Figs. 5, 6, and 7. The proximate portions of the web, which bear against each other, are secured firmly together by bolts or screws F. These intermediate portions of the web D are straight and plane, as shown, and bear against each other throughout their entire extent, and by thus forming said web and employing the bolts or screws F in double series all tendency of the said proximate portions of the web to spread apart, and hence to flatten or collapse the hollow annular rim, is counteracted. The rim C is made in sections, and the meeting ends of the said sections are provided with pins or dowels G and openings H to receive them and also with ears I, and bolts or screws K secure the said ears together in pairs, and thereby secure the sections of the rim firmly together when assembled. Ring-sections L are also inserted in the proximate ends of the hollow tire-sections, as shown at Fig. 2, and serve to add to the strength and rigidity of the wheel.

In the modification of my invention shown at Fig. 7 the rim-section is rolled to form a solid web $d$, with the inner flanges $e$ and the concavo-convex outer flange $f$ adapted for the reception and retention of a pneumatic tire M.

A spring-wheel thus constructed is adapted for use on vehicles other than those employed in the transportation of explosives, is very strong and durable, and is readily repaired when necessary.

Having thus described my invention, I claim—

1. In a spring-wheel, the combination of the hub having the end flanges $a$; with the rim or felly having the central web D and the flanges E on opposite sides thereof; and the spring-spokes having their ends passed through openings in the said end flanges $a$ and side flanges E, and having the taps $b$ on their projecting ends, substantially as described.

2. In a wheel, the rim C made of rolled metal bent to form the outer annular hollow rim $c$, which constitutes the tire, the straight intermediate web D, the proximate portions of which are plane and bear against each other throughout their entire extent, and the flanges E, and the double series of screws or bolts F, which secure the straight or plane proximate portions of the web together, for the purpose set forth, substantially as described.

3. In a spring-wheel, the rim-sections having the dowels and ears, at their proximate ends, for the purpose set forth, substantially as described.

4. In a spring-wheel, the rim-sections, made of rolled metal, bent to form the outer, annular, hollow rim c, the web portions, D, and the inner flanges E, in combination with the ring-sections L, adapted to be inserted in the proximate ends of the hollow tire, for the purpose set forth, substantially as described.

ALBERT B. WAGGONER.

Witnesses:
S. P. GOULD,
G. J. HAAS.